(12) United States Patent
Williamson et al.

(10) Patent No.: US 10,746,626 B2
(45) Date of Patent: Aug. 18, 2020

(54) VIBRATION TESTING SYSTEM AND METHODOLOGY

(71) Applicant: Bruel & Kjaer VTS Limited, Hertfordshire (GB)

(72) Inventors: Alexander Williamson, Hertfordshire (GB); Tim Bidwell, Cambridge (GB)

(73) Assignee: Bruel & Kjaer VTS Limited, Royston Hertfordshire (GB)

( * ) Notice: Subject to any disclaimer, the term of this patent is extended or adjusted under 35 U.S.C. 154(b) by 205 days.

(21) Appl. No.: 15/300,636

(22) PCT Filed: Mar. 27, 2015

(86) PCT No.: PCT/EP2015/056741
§ 371 (c)(1),
(2) Date: Sep. 29, 2016

(87) PCT Pub. No.: WO2015/150267
PCT Pub. Date: Oct. 8, 2015

(65) Prior Publication Data
US 2017/0115179 A1    Apr. 27, 2017

(30) Foreign Application Priority Data

Apr. 3, 2014 (EP) .................................. 14163418

(51) Int. Cl.
*G01M 7/02* (2006.01)
*G05B 23/02* (2006.01)
(52) U.S. Cl.
CPC ........... *G01M 7/02* (2013.01); *G05B 23/0283* (2013.01)
(58) Field of Classification Search
CPC .............................. G01M 7/02; G05B 23/0283
See application file for complete search history.

(56) References Cited

U.S. PATENT DOCUMENTS 7,705,601 B2   4/2010  Zhou
8,408,066 B1   4/2013  Romero
(Continued)

FOREIGN PATENT DOCUMENTS

CN        1603757 A     4/2005
CN     201034731 Y     3/2008
(Continued)

OTHER PUBLICATIONS

International Search Report, PCT/EP2015/056741, dated Jul. 3, 2015 (3 pages).
(Continued)

*Primary Examiner* — Yoshihisa Ishizuka
(74) *Attorney, Agent, or Firm* — Nixon Peabody LLP

(57) ABSTRACT

A vibration testing system (VTS) including a vibration testing apparatus, which includes a power amplifier operatively coupled to an electrodynamic shaker. The shaker includes a vibrateable armature mechanically coupled to a payload support structure. A data logger measures and records respective values of operational parameters of the shaker over time during mechanical excitation of the payload. A controller of the VTS reads and processes logged values of the operational parameters and determines an accumulated number of armature force cycles based on the recorded values of the operational parameters. The controller computes a remaining service-life or a consumed service life of the electrodynamic shaker based on the accumulated number of armature force cycles and a predetermined service-life of the vibration testing apparatus. The controller indicates on a display of the VTS the remaining service-life or the consumed service life of the vibration testing apparatus.

16 Claims, 2 Drawing Sheets

(56) References Cited

U.S. PATENT DOCUMENTS

| | | | |
|---|---|---|---|
| 2008/0036617 A1 | 2/2008 | Arms | |
| 2009/0205430 A1* | 8/2009 | Goodfellow | G01M 7/022 73/662 |
| 2012/0092180 A1* | 4/2012 | Rikkola | G05B 23/0232 340/679 |
| 2012/0109539 A1* | 5/2012 | Hasegawa | B23Q 17/008 702/34 |
| 2013/0298642 A1* | 11/2013 | Gillette, II | G01N 33/0009 73/31.01 |
| 2013/0335242 A1 | 12/2013 | Kakino | |

FOREIGN PATENT DOCUMENTS

| | | |
|---|---|---|
| CN | 101281087 A | 10/2008 |
| CN | 101514939 A | 8/2009 |
| CN | 201716170 U | 1/2011 |
| CN | 102110350 A | 6/2011 |
| CN | 103116134 A | 5/2013 |
| EP | 1162524 A2 | 12/2001 |
| EP | 2446998 A1 | 5/2012 |
| JP | H09-131085 A | 5/1997 |
| JP | 2001-350510 A | 12/2001 |
| JP | 2003-139657 A | 5/2003 |
| JP | 2005-062097 A | 3/2005 |
| JP | 2012-206696 A | 10/2012 |
| WO | WO 2012/133066 A1 | 10/2012 |

OTHER PUBLICATIONS

Written Opinion of the International Searching Authority, PCT/EP2015/056741, dated Jul. 3, 2015 (5 pages).

Japanese Patent Office, Notice of Reasons for Rejection in Japanese Patent Application No. 2016-560437, dated Aug. 21, 2018 (w/English translation, 9 pages).

The State Intellectual Property Office of the People's Republic of China, First Office Action and Search Report in Chinese Patent Application No. 201580018615X, dated May 18, 2018 (w/English translation, 13 pages).

* cited by examiner

VIBRATION TESTING SYSTEM AND METHODOLOGY

CROSS-REFERENCE TO RELATED APPLICATIONS

This application is a U.S. National Stage of International Application No. PCT/EP2015/056741, filed Mar. 27, 2015, which claims the benefit of European Patent Application No. 14163418.8, filed Apr. 3, 2014, both of which are incorporated herein by reference in their entireties.

The present invention relates to a vibration testing system comprising a vibration testing apparatus. The vibration testing apparatus comprises a power amplifier operatively coupled to an electrodynamic shaker wherein the shaker comprises a vibrateable armature mechanically coupled to a payload support structure. A data logger is configured to measure and record respective values of one or more operational parameters of the electrodynamic shaker over time during mechanical excitation of the payload. A processor or controller of the vibration testing system is configured to read and process logged values of the one or more operational parameters and determining an accumulated number of armature force cycles based on the recorded values over time of the one or more operational parameters. The processor is further configured to computing a remaining service-life or a consumed service life of the electrodynamic shaker based on the accumulated number of armature force cycles and a predetermined service life of the vibration testing apparatus. The processor is configured to indicating on a display of the vibration testing system the remaining service-life or the consumed service life of the vibration testing apparatus.

BACKGROUND OF THE INVENTION

The present invention relates to a vibration testing system comprising a display for indicating remaining service-life and/or consumed service life of a vibration testing apparatus. Another aspect of the invention relates to a corresponding method of determining and displaying the remaining service-life and/or the consumed service life of the vibration testing apparatus.

A vibration testing system typically comprises a vibration test apparatus, sometimes referred to as a shaker, which is employed in industry for the vibration testing of engineered products such as industrial equipment, elements and components. The object of such vibration testing is to expose the industrial equipment or components to well-defined mechanical vibration of the frequency and amplitude to which that industrial equipment may be exposed in normal use. This is carried out to test the response of the equipment to the mechanical vibrations and detect the reliability and ability of the equipment to sustain mechanical vibration without malfunctioning. The industrial equipment or components may come in a wide range of dimensions and weight. Large vibration testing systems may be capable of vibration testing very heavy and large objects like satellites.

The vibration testing apparatus typically comprises an electrodynamic vibrator or shaker, a power amplifier, a control system, cooling systems and appropriate power and signal cables interconnecting these components.

The moving elements of the vibration testing apparatus such as an armature coil, and its frame and bearings, and rollers (guidance system) are subject to wear, tear and fatigue as the electrodynamic shaker is operated. However, the amount of wear and tear is strongly dependent on the force produced by the payload on the electrodynamic shaker such that even a small increase of payload leads to a dramatic increase of the wear and tear of the shaker and a corresponding decrease of the remaining service life of the vibration testing apparatus. The electrodynamic shaker of the vibration test apparatus is designed to be repairable/overhauled and kept in an operational condition through a pre-programmed system of planned service with fixed service intervals. The length of this service interval is typically estimated from the type/model of vibration testing apparatus and the expected usage pattern of the customer in question.

The determination of a remaining service life and availability of such vibration testing systems (VTS) has so far been achieved by service regimes based upon reactive observation of the behaviour of the vibration testing system in question. The regime of reactive observation means that malfunctions or errors of the vibration testing system that occur in-between the planned service intervals have only been detected and reported by the operator or user when obvious errors such as audible, tactile or visible anomalies in the function of the electrodynamic shaker are noticeable.

The fixed or pre-programmed service intervals lead to several problems for an optimal use and exploitation of existing vibration testing apparatuses and systems. One of these problems is a changing usage pattern of the vibration test apparatuses which deviates from the usage pattern employed to determine the length of the service interval. The customer may for example apply a higher payload to the electrodynamic shaker of the vibration testing apparatus than expected because new or modified equipment need to be vibration tested. The customer may also operate the electrodynamic shaker for much longer time periods than expected due to an increase of equipment production, or the introduction of more elaborate vibration testing protocols. Because the amount of wear and tear on movable components of the vibration test apparatuses, in particular the electrodynamic shaker, depend so strongly on the armature force these types of deviation from the expected usage pattern can on one hand lead to a much shorter service life than expected and therefore failure of the vibration testing apparatuses in-between the service intervals during use. On the other hand, if the shaker loading and accompanying armature force is smaller than expected, the time between the planned service intervals will be unnecessarily short and waste user resources and costs in connection with the operation of the vibration testing system and apparatus Hence, it would be highly desirable to provide the users' of a vibration testing system and apparatus with a mechanism capable of estimating and informing various type of relevant personnel of the remaining service-life and/or the consumed service life of the vibration testing apparatus. The users may include service personnel and system operators.

The availability of information of the remaining service-life and/or the consumed service life of the vibration testing system and apparatus would improve production planning by preventing unexpected wear and tear induced failures and eliminate unnecessary and wasteful service or maintenance activities.

The remaining service-life and/or the consumed service life information could advantageously be displayed on a display/screen readily accessible to the relevant individuals such as service personnel, operators etc. This display could of course be attached to a housing of the vibration test apparatuses or be a located on a separate portable device, for example integrated in a smartphone or tablet, and therefore readable remotely from the vibration testing apparatus.

It would also be advantageous to indicate the remaining service-life and/or the consumed service life information in a straight forward and easily understandable format such as a meter or bar graph, e.g. resembling a car fuel meter/fuel gauge, of a graphical user interface of the display.

SUMMARY OF THE INVENTION

A first aspect of the invention relates to a vibration testing system comprising a vibration testing apparatus. The vibration testing apparatus comprises a power amplifier operatively coupled to an electrodynamic shaker wherein the shaker comprises a vibrateable armature mechanically coupled to a payload support structure. A data logger is configured to measure and record respective values of one or more operational parameters of the electrodynamic shaker over time during mechanical excitation of the payload. A processor or controller of the vibration testing system is configured to read and process logged values of the one or more operational parameters and determining an accumulated number of armature force cycles based on the recorded values of the one or more operational parameters. The processor is further configured to computing a remaining service-life or a consumed service life of the electrodynamic shaker based on the accumulated number of armature force cycles and a predetermined service life of the vibration testing apparatus. The processor is configured to indicating on a display of the vibration testing system the remaining service-life or the consumed service life of the vibration testing apparatus.

The display of the remaining and/or consumed service-life of the present vibration testing system provides the relevant personnel with a beneficial mechanism for assessing or evaluating accurately when service will be due. The availability of this service-life information is capable of improving production planning by preventing unexpected wear and tear induced failures of the vibration testing apparatus in-between planned service intervals. The display of the service-life information is also able to eliminate unnecessary and wasteful service or maintenance activities on the vibration testing apparatus in situations where shaker loading, and hence the number of armature force cycles, has been smaller than expected at the time when the service interval was planned.

The skilled person will understand that processor and display may be configured to show the remaining and/or consumed service-life is many different formats depending on factors like the size, orientation and placement of the display and its surroundings. According to a preferred embodiment of the invention, the remaining or consumed service-life is indicated by a measuring scale or as a numerical value. The measuring scale may for example comprise a bar graph, or a curved scale showing consumed service-life from e.g. 0 to 100%. The numerical value may be a direct numerical read-out of the percentage of consumed service-life or percentage of remaining service-life or both. Hence, the indication of the remaining or consumed service-life may resemble that of a car petrol meter or oil level meter etc. This feature makes the service life indication intuitively comprehensible to a broad range of relevant personnel.

The time varying force on the vibrateable armature during operation of the shaker must be sampled at appropriate time intervals to accurately determine the accumulated number of armature force cycles. How often the time varying force on the vibrateable armature must be sampled will depend on how rapidly the force changes. The force on the vibrateable armature can be indirectly determined from certain measurements of certain operational parameters of the vibration testing apparatus and certain pre-stored system parameters. In one such embodiment, the armature force is determined indirectly from the measured a.c. current in a moving coil of the vibrateable armature, i.e. armature coil, in conjunction with knowledge of magnetic field strength in the air gap wherein the armature coil vibrates or oscillates. The a.c. current in the armature coil may be measured in a power amplifier driving the shaker via a suitable current sensor. In these embodiments, the one or more operational parameters of the electrodynamic shaker therefore preferably comprises at least one of:

operating time and date of the electrodynamic shaker;

an a.c. current of the moving coil of the vibrateable armature;

a d.c. current or d.c. voltage of a field coil of the shaker.

The pre-stored system parameters of the vibration testing apparatus may be stored in a system reference database or table accessible to the processor and holding technical apparatus data indicating one or more of:

the predetermined service life of the vibration testing apparatus;

the magnetic flux density or field strength in the armature air gap versus field coil current;

a conductor length of a moving coil of the vibrateable armature.

This indirect armature force determination based on the measured operational parameters and pre-stored system parameters is explained in further detail below with reference to the appended drawings.

In the alternative, a direct measurement of the time varying force on the vibrateable armature may be performed by placing one or more accelerometers on suitable location(s) of the vibrateable armature structure. Hence, in this embodiment, at least one of the operational parameters of the electrodynamic shaker comprises the acceleration of the armature as measured by the accelerometer(s) mounted thereon.

The display of the vibration testing system may be physically arranged at different locations either at or on the vibration testing apparatus or in a remote location from the vibration testing apparatus for example in another room of the same building, or in another building. In one embodiment, the display is mounted to a housing or frame structure of the vibration testing apparatus for example on the housing or frame structure of the power amplifier. In other embodiments of the system, the display is arranged remotely from the vibration testing apparatus and connected to the processor or controller via a wired or wireless data communication link for receipt of data indicating the remaining service-life, consumed service life or both of the electrodynamic shaker. The data communication link may be selected from a group of {Wi-Fi, LAN, WLAN, GSM, GRPS, Bluetooth}. In the latter embodiments, the display may be mounted on, or in, a portable computing device such as a smartphone, tablet or laptop computer wirelessly receiving data indicating the remaining service-life or consumed service life from the processor of the vibration testing apparatus.

The processor or controller of the vibration testing apparatus is preferably arranged inside a housing of the vibration testing apparatus to provide a self-contained apparatus capable of operating without access to external computing resources. The processor or controller preferably comprises software programmable microprocessor, for example a programmable Digital Signal Processor, and the latter devices may form part of an embedded computing system mounted inside, or at, the housing of the vibration testing apparatus.

However, in alternative embodiments of the vibration testing system the processor or controller is arranged remotely from the vibration testing apparatus for example in an internet connected computer server. In such embodiments, the data logger of the vibration testing apparatus may be connected to the computer server through a wired or wireless data communication link for example comprising a TCP/IP communication channel for transmission of the one or more operational parameters to the server computer. The internet connected computer server may be placed in a cloud computing center. The processor(s) of the computer server is configured to, by execution of a suitable program routine, carry out the reading and processing of the logged values of the one or more operational parameters to determine the accumulated number of armature force cycles. The server processor is also configured to computing the remaining service-life and/or consumed service life of the electrodynamic shaker. The processor(s) of the computer server may finally transmit the remaining service-life and/or consumed service life to the display via the TCP/IP communication channel or any other suitable data communication channel.

The processor of the vibration testing system may be further configured to: regularly computing a reference behaviour of the shaker based on the recorded values of the one or more operational parameters wherein the reference behaviour comprises a frequency response characteristic of the shaker such as a fundamental resonance frequency. The processor may be adapted to indicating the computed reference behaviour on the display at regular time intervals. This embodiment may be used as an additional tool to monitor the performance of the shaker between the service intervals and possibly issue early warnings about upcoming wear-and-tear failures of the shaker by detecting variations in the reference behaviour.

The logged values of the one or more operational parameters such as the a.c. current or a.c. voltage in the armature coil may be used to determine changes in certain frequency response characteristics of the shaker over time. The frequency response characteristics may for example comprise the fundamental resonance frequency or a compliance or resistance of a suspension of the vibrateable armature. An abnormal or unexpected change of one or more of the shaker frequency response, the armature fundamental resonance frequency and the compliance of the suspension may be indicative of a shaker requiring maintenance or repair.

A second aspect of the invention relates to a method of determining and displaying remaining service-life or consumed service life of a vibration testing apparatus. The method comprising steps of:

a) measuring and recording respective values of one or more operational parameters over time of an electrodynamic shaker during vibrational excitation of a payload, b) determining an accumulated number of armature force cycles on a vibrateable armature of the electrodynamic shaker based on the recorded values of the one or more operational parameters, c) computing a remaining service life or a consumed service life of the electrodynamic shaker based on the accumulated number of armature force cycles and a predetermined service life of the vibration testing apparatus, d) indicating, on an operator readable display, the remaining service-life and/or the consumed service life of the vibration testing apparatus.

The predetermined service life of the vibration testing apparatus is preferably stored in the previously discussed system reference database or table for example expressed as a time period in days, months or hours, The maximum or total number armature force cycles on the shaker which corresponds to this predetermined service life is also stored in the system reference database or table. Thereby, the remaining service-life of the electrodynamic shaker can be calculated by subtracting the accumulated number of armature force cycles from the maxim number of armature force cycles to firstly determine the remaining number of force cycles and then convert the latter number to the corresponding remaining service life.

The computed remaining service-life or computed consumed service life is preferably indicated as a time period or a percentage value by a suitable scale or a numerical value on the display as discussed above.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1:
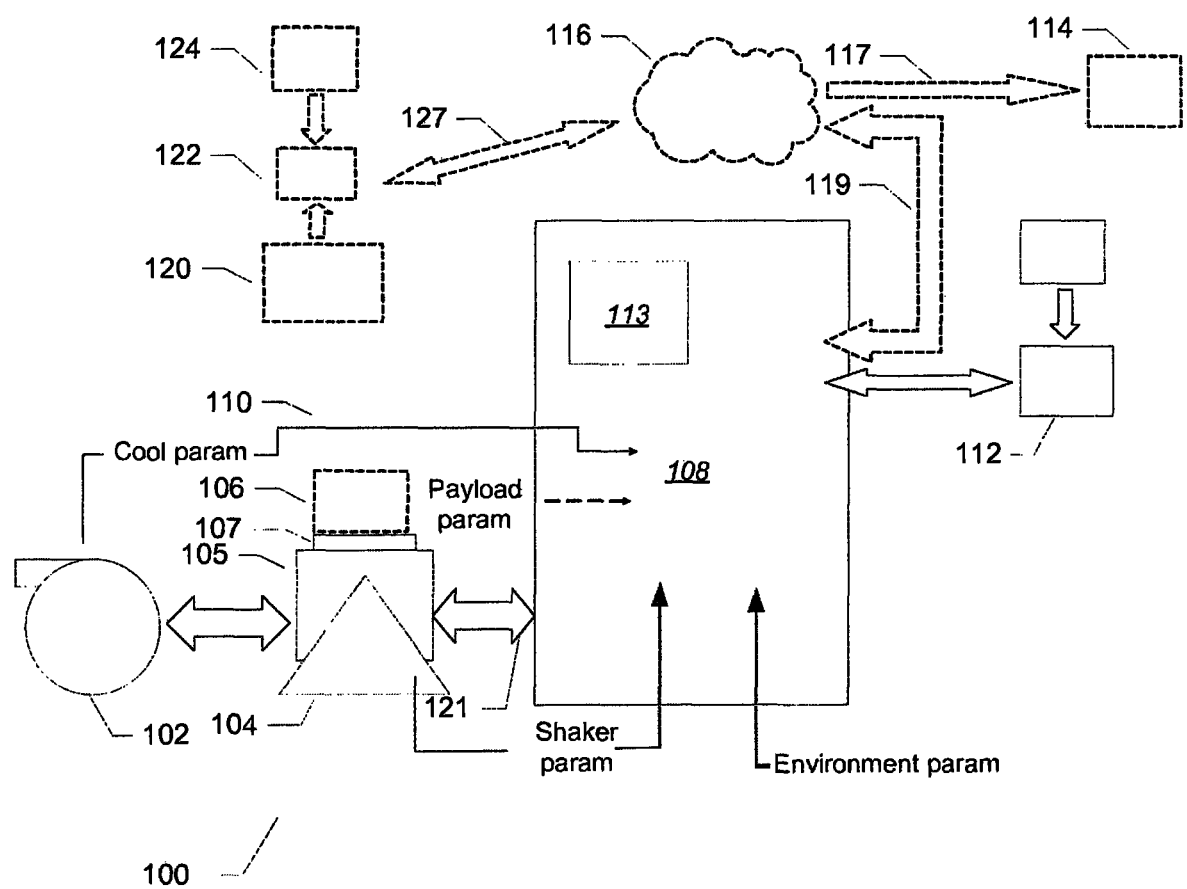
FIG. 1 shows a simplified schematic drawing of a vibration testing apparatus and system in accordance with a first embodiment of the invention.

FIG. 1 shows a simplified schematic drawing of a vibration testing apparatus forming part of a vibration testing system 100 in accordance with a first embodiment of the invention. The vibration testing apparatus comprises a power amplifier 108, mounted in a separate housing or casing, operatively coupled to an electrodynamic shaker 104 via a signal and power cable 121. The electrodynamic shaker 104 comprises a vibrateable armature 105 mechanically coupled to a payload support structure 107. The latter holds a payload 106 which is the equipment or component under vibratory test. The vibration testing apparatus comprises a display 113 which is mounted to a floor-standing housing or frame of the power amplifier 108 in the present embodiment of the invention. The display 113 may comprise a separate and remotely arranged display in other embodiments of the system 100 or a combination of a remote display and a display mounted on the floor-standing housing or frame of the power amplifier 108. A data logger (not shown) is mounted inside the housing of the power amplifier 108 and configured to measure and record respective values of several operational parameters of the electrodynamic shaker 104 over time during its operation, i.e. during mechanical excitation of the payload 106. The operational parameters preferably include operating time and date of the electrodynamic shaker 104 to allow computation of an accumulated operational time since last service/overhaul. Furthermore, RMS current values and peak current values of a current flowing in a moving coil (not shown) of the vibrateable armature 105 are also recorded/logged during operating time periods. In addition, DC current values and/or DC voltage values of a field coil (not shown) of the electrodynamic shaker 104 are also measured and recorded provided that the electrodynamic shaker 104 comprises such a field coil. These RMS and peak current values may be measured directly or indirectly by suitable current sensors mounted inside the power amplifier 108 or current sensors mounted in the electrodynamic shaker 104. Various well-known types of current sensors may be utilized for this purpose such as Hall effect elements and inductive a.c. current sensors.

The skilled person will appreciate that the respective measurements and logging of the currents in the armature coil and field coil over time allow the armature force on the vibrateable armature 105 to be computed. The current in the field coil determines a magnetic field strength of the magnetic field in which the armature is movably suspended. Hence, the force produced by the armature 105 of the electrodynamic shaker 104 is directly proportional to the current flowing within the armature coil, the length of the armature coil conductor and the strength of the magnetic field that the armature coil is moving within.

The computation of the armature force over time is preferably performed by a software programmable microprocessor, e.g. a Digital Signal Processor, of the vibration testing apparatus. The microprocessor may form part of an embedded computing board or sub-system mounted inside the housing of power amplifier 108. The microprocessor may be configured to execute an application program or software component that reads and processes logged values of the above-mentioned operational parameters. The application program or software component comprises a set of microprocessor executable program instructions. The application program is configured to determining the armature force on the vibrateable armature 105 over time based on the recorded RMS current values and peak current values of the moving coil current and the recorded DC current values of the field coil current. The application program furthermore records or logs corresponding vibrational frequencies of the armature and subsequently determines an accumulated number of armature force cycles based on the logged operational parameter values as explained below in connection with FIG. 2. The accumulated number of armature force cycles is used as a basis for computing the remaining service-life and/or consumed service life of the vibration testing apparatus explained below in connection with FIG. 2.

Once, the application program has computed the remaining service-life and/or consumed service life of the vibration testing apparatus, the microprocessor may cause these values to be displayed either in numerical format or graphical format, e.g. pie diagram, bar graph etc., on the display 113 attached to, or integrated in, the housing of the power amplifier 108. The remaining service-life and/or consumed service life may additionally, or alternatively, be displayed on a separate screen or display such as a display of on-site service PC 112 or a display of portable terminal or device, for example integrated in a smartphone or tablet.

In another embodiment, the computed remaining service-life and/or computed consumed service life of the vibration testing apparatus is transmitted via a data communication link 119 to an internet connected computer server 116. The latter may reside in a cloud based computing center. The data communication link 119 may utilize a TCP/IP protocol in the communication channel. In this manner, service life data, including the remaining service-life and/or consumed service life of the vibration testing apparatus and system, can be accessed from numerous geographical locations via suitably configured internet-based data communication services and channels 117. The remaining service-life and/or consumed service life may of course be updated at regular time intervals such as a time interval between 1 second and 10 minutes, e.g. about every 10 seconds. Hence, it is possible to remotely monitor the remaining service-life and/or consumed service life of the vibration testing apparatus. It is also possible to observe the rate of change of remaining service life. The remaining service-life and/or consumed service life may for example be transmitted by the internet connected computer server 116 to an email address and computer 114 of a customer or service technician. The remaining service-life and/or consumed service life may alternatively, or additionally, be transmitted to a predetermined mobile phone number (as text or SMS message). This embodiment has the advantage that various types of personnel associated with the operation of the vibration testing system 100 may be informed about the service-life and/or consumed service life of the vibration testing apparatus in an efficient and convenient manner.

In yet another embodiment of the present vibration testing apparatus and system, the previously discussed microprocessor/DSP of the system 100 is arranged remotely from the vibration testing apparatus for example in the internet connected computer server 116. In this embodiment, the data logger of the vibration testing apparatus is connected to the computer server through the data communication link 119, e.g. comprising the TCP/IP communication channel, for transmission of the previously discussed recorded values of the operational parameters to the computer server 116. The computer server 116 executes a suitable application program or software component configured to compute the remaining service-life and/or consumed service life of the vibration testing apparatus based on the recorded values of the operational parameters associated with the force on the vibrateable armature 105 of the electrodynamic shaker 104 as outlined below.

The internet connected computer server 116 may alternatively be configured to only store the previously discussed recorded values of the operational parameters without performing the above-described computation of the remaining service-life and/or consumed service life of the vibration testing apparatus. The recorded values of the operational parameters may for example be stored in a suitable database running on the internet connected computer server 116. The recorded values of the operational parameters may be accessed from a service computer 122 via an internet-based data communication service and channel 127. The service computer may comprise the microprocessor that performs the above-described computation of the remaining service-life and/or consumed service life of the vibration testing apparatus. The remaining service-life and/or consumed service life may be displayed on a display of the service computer 122 by a suitable software component 120 running on the service computer 122.

The skilled person will appreciate that the presence of the optional internet connected computer server 116 in present vibration testing system 100 may provide numerous advantages in terms of geographically flexible and near instant access to the recorded values of the operational parameters and/or remaining service-life and/or consumed service life of the vibration testing apparatus and system. Another advantage of the internet connected computer server 116 is that the latter may store, e.g. in suitable database, recorded values of the operational parameters of a plurality of vibration testing systems such that various forms of correlation analysis between operational parameters from different vibration testing apparatuses may be exploited to improve or validate formulas for estimating the remaining service-life and/or consumed service life of the apparatuses.

Figure 2:
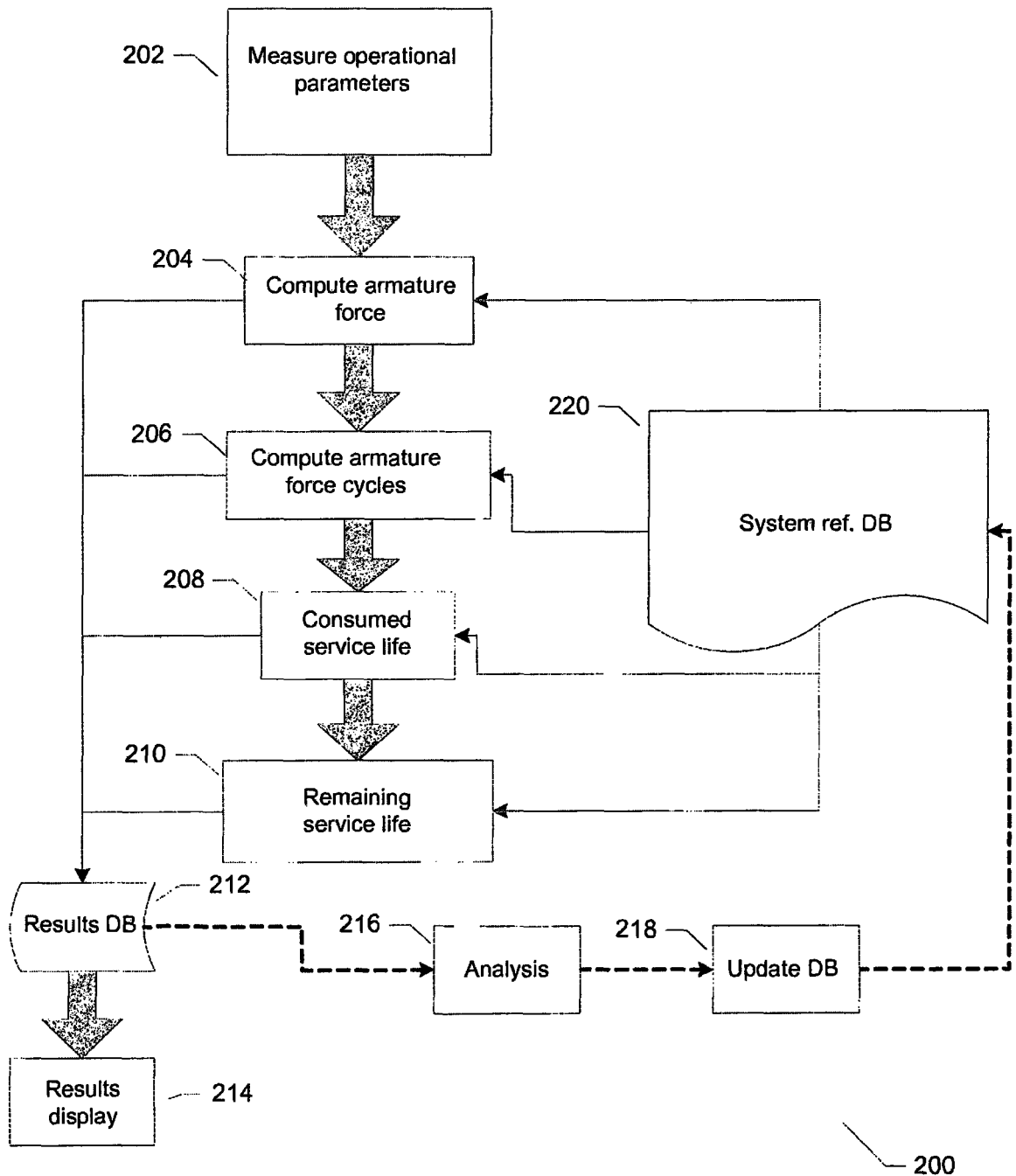
FIG. 2 shows a flowchart of program steps of an application program for estimating and displaying the remaining service-life and/or the consumed service life of the vibration testing apparatus.

FIG. 2 shows a flow-chart 200 of program steps of the previously discussed application program or software routine executed on the microprocessor for estimating and displaying the remaining service-life and/or the consumed service life of the vibration testing apparatus. The application program has access to a system reference database 220 holding various types of useful technical data about characteristics of the vibration testing apparatus including the predetermined service life of the vibration testing apparatus. The system reference database 220 may be located physically at different locations such as in a memory inside the housing of the vibration testing apparatus or in a memory of the previously discussed internet connected computer server 116.

The technical data also comprises a system life table mapping an accumulated number of armature force cycles to the consumed service life. The data held in this system life table may have been derived from experimental operation of an identical or similar shaker to the one of the vibration testing apparatus in suit to determine how the armature force impacts the accumulation of armature force cycles, and hence the consumption of service life, across a broad range of realistic armature force levels and vibration frequencies.

The technical data may additionally comprise information about the magnetic flux density in the armature air gap versus the field coil current for example as a look-up table. The technical data may additionally comprise information about the conductor length of the armature coil.

In step 202 the data logger measures and records respective values of the previously discussed operational parameters over time such as the armature coil current and frequency of vibration of the armature of the electrodynamic shaker 104 during its operation.

In step 204, the force on the armature is computed at either regular or variable time intervals based on the measured armature current, the above-mentioned technical data from system reference database 220 in combination with the well-known equation:

$$F(t)=B*L*i(t)$$

Where B=magnetic flux density in the armature air gap;
L=length of armature conductor;
i=electric current within the armature coil.

The vibration frequency of the armature is preferably also determined together with the measurement of armature current for example by Fourier analysing the armature coil current to reveal its frequency spectrum. Hence, coherent data pairs of armature force and armature vibration frequency over time are logged into the data logger during operation of the shaker.

In step 206, the accumulated number of armature force cycles is computed by summing over time the logged coherent pairs of armature force and armature vibration frequency with reference to the data of the system life table which describes how a particular armature force and vibration frequency consumes armature force cycles. The computation of the accumulated number of armature force cycles takes therefore into account the accelerated service life consumption induced by relatively short time periods, or few armature cycles, with unusually high armature force by referring to the table. Hence, the accumulated number of armature force cycles computed represents an accurate measure of the amount of wear and tear induced on the shaker by its operation since the last service or repair operation.

In step 208, the consumed service-life of the electrodynamic shaker is calculated by comparing the accumulated number of armature force cycles to the maxim number of armature force cycles which corresponds to the predetermined service life held in previously discussed system life table of the system reference database 220.

In step 210, the remaining service-life of the electrodynamic shaker is calculated by subtracting the accumulated number of armature force cycles from the maxim number of armature force cycles to first compute the remaining number of force cycles. The remaining service-life can then be determined by converting the remaining number of force cycles into a time period based on the known value of the predetermined service. For example, if the predetermined service life is set to 12 months and this corresponds to 10000 armature force cycles then a count of 7500 accumulated armature force cycles would correspond to a consumed service life of 9 months and a remaining service life of 3 months.

In step 212, the computed value of the remaining service life is stored in an optional results database which may be used for various analysis purposes as described below in additional detail. The remaining service life is additionally transmitted to the display, or multiple separate displays, of the vibration testing system.

In step 214, the remaining service life may be displayed numerically or graphically for example as an absolute time period, e.g. 3 months in the above example, or as a percentage of the predetermined service-life value, e.g. 25% as discussed above. In the latter situation, the shaker operator may convert the percentage value to the corresponding remaining service life by knowledge of the predetermined service-life (e.g. 12 months). The optional results database 212 may reside in the vibration testing apparatus or may reside within the previously discussed remote cloud based computing center (item 116 of FIG. 1) allowing authorized individuals access to the consumed and remaining service life data of the vibration testing apparatus from numerous geographical locations as discussed above. As also mentioned before, the software component running on the internet connected computer server may have recorded respective values of the operational parameters of numerous vibration testing systems. As schematically illustrated by step 216, the software component can perform various types of useful correlation analysis between recorded operational parameters from the numerous vibration testing systems to refine or validate formulas and table data for estimating the accumulated number of armature force cycles and computing the remaining service-life and/or consumed service life of the apparatuses. The results of these correlation assessments may be stored in the previously discussed database running on the internet connected computer server in step 218.

The invention claimed is:

1. A vibration testing system comprising:
    a vibration testing apparatus comprising a power amplifier operatively coupled to an electrodynamic shaker wherein the shaker comprises a vibrateable armature mechanically coupled to a payload support structure,
    a data logger configured to measure and record respective values of a plurality of operational parameters of the electrodynamic shaker over time, t, during mechanical excitation of the payload support structure, said values of the plurality of operational parameters including coherent pairs of armature coil current and armature vibration frequency of the vibrateable armature,
    a processor or controller configured to read and process the logged values by the data logger of the plurality of operational parameters;
    the processor being configured to:
    compute a plurality of armature forces over the time, t, on the armature of the electrodynamic shaker, each armature force computed based on a value of the measured armature coil current according to $F(t)=B*l*I(t)$, where B is a magnetic flux density in an air gap of the vibrateable armature, l is a length of a conductor of an armature coil of the vibrateable armature, and I is electric current within the armature coil, produce coherent data pairs from the computed plurality of armature forces such that a respective armature force is paired with a respective armature vibration frequency over the time, t, determine an accumulated number of armature force cycles on the vibrateable armature by summing the produced coherent data pairs of armature force and armature vibration frequency with reference to a system life table, wherein said system life table defines how a particular pair of armature force and armature vibration frequency consumes armature force cycles as an indication of an amount of wear and tear induced on the electrodynamic shaker thereby impacting a remaining service life of the vibration testing apparatus, compute a remaining service-life or a consumed service-life of the electrodynamic shaker by comparing the determined accumulated number of armature force cycles with a maximum number of armature force cycles, and subtracting the determined accumulated number of armature force cycles from the maximum number of armature force cycles in the system life table to determine the remaining service-life or consumed service-life based on a predetermined service-life, and indicate on a display of the vibration testing system the remaining service-life or the consumed service life of the vibration testing apparatus.

2. A vibration testing system according to claim 1, wherein the display is configured to show the remaining service-life by a measuring scale or as a numerical value or show the consumed service life by a measuring scale or as a numerical value.

3. A vibration testing system according to claim 1, wherein the display is mounted to a housing or frame structure of the vibration testing apparatus on the housing or frame structure of the power amplifier.

4. A vibration testing system according to claim 1, wherein the display is arranged remotely to the vibration testing apparatus, and connected to the processor or controller via a data communication link for receipt of data indicating the remaining service-life or consumed service life of the electrodynamic shaker.

5. A vibration testing system according to claim 4, wherein the display is mounted on or in a portable computing device, the portable computing device being a smartphone, a tablet, or a laptop computer.

6. A vibration testing system according to claim 1, wherein the processor or controller is arranged inside a housing of the vibration testing apparatus forming part of an embedded computing system comprising a software programmable microprocessor.

7. A vibration testing system according to claim 1, wherein the processor or controller is arranged remotely from the vibration testing apparatus in an internet connected computer server; and the data logger of the vibration testing apparatus being connected to the computer server through an TCP/IP communication channel for transmission of the one or more operational parameters to the server computer.

8. A vibration testing system according to claim 1, wherein the one or more operational parameters of the electrodynamic shaker comprises at least one of:

operating time and date of the electrodynamic shaker;
an a.c. current of a moving coil of the vibrateable armature (I);
a d.c. current or d.c. voltage of a field coil of the shaker.

9. A vibration testing system according to claim 1, wherein the one or more operational parameters of the electrodynamic shaker comprises at least one of:

an acceleration of the electrodynamic shaker measured by an accelerometer mounted on the vibrateable armature.

10. A vibration testing system according to claim 1, wherein the processor is further configured to:

periodically computing a reference behaviour of the shaker based on the recorded values of the one or more operational parameters, wherein the reference behaviour comprises a frequency response characteristic of the shaker, wherein the frequency response characteristic is a fundamental resonance frequency of the shaker.

11. A vibration testing system according to claim 10, wherein the processor is further configured to:

indicating on the display the computed reference behaviour.

12. A vibration testing system according to claim 1, comprising a processor accessible database holding vibration apparatus data indicating one or more of:

the predetermined service life of the vibration testing apparatus;
the magnetic flux density (B) in the armature air gap versus field coil current;
the conductor length (l) of a moving coil of the vibrateable armature.

13. A vibration testing system according to claim 2, wherein the one or more operational parameters of the electrodynamic shaker comprises at least one of:

an acceleration of the electrodynamic shaker measured by an accelerometer mounted on the vibrateable armature.

14. A vibration testing system according to claim 2, wherein the processor or controller is arranged remotely from the vibration testing apparatus in an internet connected computer server; and the data logger of the vibration testing apparatus being connected to the computer server through an TCP/IP communication channel for transmission of the one or more operational parameters to the server computer.

15. A method of determining and displaying remaining service-life or consumed service life of a vibration testing apparatus, comprising steps of:

a) measuring and recording respective values of a plurality of operational parameters by a data logger over time, t of an electrodynamic shaker during vibrational excitation of a payload, said values of the plurality of operational parameters including coherent pairs of armature coil current and armature vibration frequency of a vibrateable armature of the electrodynamic shaker, a1) computing a plurality of armature forces over the time, t, on the armature of the electrodynamic shaker, each armature force computed based on a value of the measured armature coil current according to $F(t)=B*l*I(t)$, where B is a magnetic flux density in an air gap of the vibrateable armature, l is a length of a conductor of an armature coil of the vibrateable armature, and I is electric current within the armature coil, a2) producing coherent data pairs from the computed plurality of armature forces such that a respective armature force is paired with a respective armature vibration frequency over the time, t, b) determining by a processor an accumulated number of armature force cycles on the vibrateable armature of the electrodynamic shaker by summing the produced coherent data pairs of armature force and armature vibration frequency with reference to a system life table, wherein said system life table defines how a particular pair of armature force and armature vibration frequency consumes armature force cycles as an indication of an amount of wear and tear induced on the electrodynamic shaker thereby impacting a remaining service life of the vibration testing apparatus, c) computing by the processor a remaining service-life or a consumed service life of the electrodynamic shaker by comparing the determined accumulated number of armature force cycles with a maximum number of armature force cycles, and subtracting the determined accumulated number of armature force cycles from the maximum number of armature force cycles in the system life table to determine the remaining service-life or consumed service-life based on a predetermined service-life, and d) indicating, on an operator readable display, the remaining service-life and/or the consumed service life of the vibration testing apparatus.

16. A method of determining and displaying remaining service-life or consumed service life of a vibration testing apparatus according to claim 15, wherein the remaining service-life or the consumed service life is indicated by a scale or a numerical value on the display.

\* \* \* \* \*